(12) United States Patent
Lin

(10) Patent No.: US 12,437,483 B2
(45) Date of Patent: Oct. 7, 2025

(54) DEVICE AND METHOD FOR EXTENDED REALITY INTERACTION AND COMPUTER-READABLE MEDIUM THEREOF

(71) Applicant: Wonders.ai Inc., Taipei (TW)

(72) Inventor: Michael Chun-Ta Lin, Taipei (TW)

(73) Assignee: Wonders.ai Inc., Taipei (TW)

( * ) Notice: Subject to any disclaimer, the term of this patent is extended or adjusted under 35 U.S.C. 154(b) by 348 days.

(21) Appl. No.: 18/129,141

(22) Filed: Mar. 31, 2023

(65) Prior Publication Data

US 2024/0037866 A1 Feb. 1, 2024

Related U.S. Application Data

(60) Provisional application No. 63/393,302, filed on Jul. 29, 2022.

(51) Int. Cl.
*G06T 19/00* (2011.01)
*H04L 67/131* (2022.01)

(52) U.S. Cl.
CPC .......... *G06T 19/006* (2013.01); *H04L 67/131* (2022.05)

(58) Field of Classification Search
None
See application file for complete search history.

(56) References Cited

U.S. PATENT DOCUMENTS

| | | | |
|---|---|---|---|
| 2018/0315329 A1 | 11/2018 | D'Amato et al. | |
| 2022/0309725 A1* | 9/2022 | Joo | H04L 67/289 |
| 2023/0274580 A1* | 8/2023 | Yao | G06V 10/44 |
| | | | 382/107 |
| 2023/0316658 A1* | 10/2023 | Smith | G06T 19/00 |
| | | | 345/419 |
| 2023/0385011 A1 | 11/2023 | Shimizu et al. | |

FOREIGN PATENT DOCUMENTS

| | | |
|---|---|---|
| CN | 113971230 A | 1/2022 |
| JP | 2016126500 A | 7/2016 |
| JP | 2020522763 A | 7/2020 |
| WO | 2022091832 A1 | 5/2022 |

OTHER PUBLICATIONS

Japan Patent Office, "Office Action", Apr. 9, 2024, Japan.

* cited by examiner

*Primary Examiner* — Tapas Mazumder
(74) *Attorney, Agent, or Firm* — Troutman Pepper Locke LLP; Tim Tingkang Xia, Esq.

(57) ABSTRACT

A system for extended reality interaction includes a sender device and a recipient device. The sender device generates a data block based on action data corresponding to a virtual object and transmits the data block to a recipient device. The data block includes tag information for indicating the device generated the action data, object information corresponding to the virtual object, and motion information for describing motions of the virtual object in a first XR environment. The recipient device then presents the motions of the virtual object in a second XR environment according to the tag information, the object information, and the motion information.

30 Claims, 5 Drawing Sheets

DEVICE AND METHOD FOR EXTENDED REALITY INTERACTION AND COMPUTER-READABLE MEDIUM THEREOF

CROSS-REFERENCE TO RELATED APPLICATIONS

This application claims priority to U.S. Provisional Patent Application No. 63/393,302 filed on Jul. 29, 2022, which is hereby incorporated by reference in its entirety.

BACKGROUND OF THE INVENTION

A variety of extended reality (XR) technologies such as virtual reality (VR), augmented reality (AR), mixed reality (MR), 3D reality, or the like are available for providing an immersive experience for users. Well-known AR technologies may include ARKit from Apple Inc., ARCore from Google Inc., HoloLens 2 from Microsoft, Magic Leap, etc. Well-known VR technologies may include Vive from HTC Inc., Quest 2 from Meta Inc., etc.

The combination of motion capturing technology, broadcasting technology, and said XR technology allows users to interact with each other in the same type of XR environment corresponding to said XR technology. For example, the users of AR devices (e.g., smartphones) can interact with each other in an AR environment. However, devices that run in different XR technologies (e.g., AR and 3D Reality) would fail to operate ideally when their users attempt to interact with each other via their own device, since each kind of XR technology/device has its own configurations and data format, i.e., a device that adopts one kind of XR technology cannot process (i.e., understand) the data generated and received from another end device that adopts a different XR technology. Accordingly, there is an urgent need in the art for new way of cross-platform XR interaction.

SUMMARY OF THE INVENTION

To solve at least the abovementioned problem, the present disclosure provides an electronic computing device for XR interaction. The electronic computing device may comprise a storage, a processor electrically connected with the storage, and a transceiver electrically connected with the storage and the processor. The storage may be configured to store action data corresponding to a virtual object. The processor may be configured to generate a data block based on the action data. The data block may comprise tag information for indicating the device generated the action data, object information corresponding to the virtual object, and motion information for describing motions of the virtual object in a first XR environment. The transceiver may be configured to transmit the data block to a recipient device, such that the recipient device presents the motions of the virtual object in a second XR environment according to the tag information, the object information, and the motion information.

To solve at least the abovementioned problem, the present disclosure further provides another electronic computing device for XR interaction. The electronic computing device may comprise a processor electrically and a transceiver electrically connected with the processor. The transceiver may be configured to receive a data block from a sender device. The data block may comprise tag information for indicating the device generated action data that is used to generate the data block, object information corresponding to a virtual object, and motion information for describing motions of the virtual object in a first XR environment. The processor may be configured to present the motions of the virtual object in a second XR environment according to the tag information, the object information, and the motion information.

To solve at least the abovementioned problem, the present disclosure further provides a method for XR interaction. The method may comprise steps as follows:
    generating, by an electronic computing device, a data block based on action data corresponding to a virtual object, the data block comprising tag information for indicating the device generated the action data, object information corresponding to the virtual object, and motion information for describing motions of the virtual object in a first XR environment; and
    transmitting, by the electronic computing device, the data block to a recipient device, such that the recipient device presents the motions of the virtual object in a second XR environment according to the tag information, the object information, and the motion information.

To solve at least the abovementioned problem, the present disclosure further provides another method for XR interaction. The method may comprise steps as follows:
    receiving, by an electronic computing device, a data block from a sender device, wherein the data block comprises tag information for indicating the device generated action data that is used to generate the data block, object information corresponding to a virtual object, and motion information for describing motions of the virtual object in a first XR environment; and
    presenting, by the electronic computing device, the motions of the virtual object in a second XR environment according to the tag information, the object information, and the motion information.

To solve at least the abovementioned problem, the present disclosure further provides a non-transitory computer-readable medium. An electronic computing device may execute a method for XR interaction after a plurality of program instructions comprised in the non-transitory computer-readable medium are loaded into the electronic computing device. The method may comprise steps as follows:
    generating a data block based on action data corresponding to a virtual object, the data block comprising tag information for indicating the device generated the action data, object information corresponding to the virtual object, and motion information for describing motions of the virtual object in a first XR environment; and
    transmitting the data block to a recipient device, such that the recipient device presents the motions of the virtual object in a second XR environment according to the tag information, the object information, and the motion information.

To solve at least the abovementioned problem, the present disclosure further provides another non-transitory computer-readable medium. An electronic computing device may execute another method for XR interaction after a plurality of program instructions comprised in the non-transitory computer-readable medium are loaded into the electronic computing device. The method may comprise steps as follows:
    receiving a data block from a sender device, wherein the data block comprises tag information, object information corresponding to a virtual object, and motion information for describing motions of the virtual object in a first XR environment; and presenting the motions of the virtual object in a second XR environment according to the tag information, the object information, and the motion information.

The present disclosure provides a solution mechanism, which integrates the data logics of various XR technologies via the implementation of the data block comprising at least information such as the tag information, object information, and motion information mentioned above. By implementing the mechanism of the present disclosure, the devices in different XR platforms may refer to the same XR environment by performing the communication via the data block. This allows each XR device to focus only on the transformation of local data and the data block. That is, the data block serves as a kind of "common language" spoken by every XR device in the same XR system. Therefore, the disclosed mechanism enables XR interaction between multiple users via their own device, even if the devices support different XR environments, and thus indeed solves the technical problem of current XR technologies as mentioned above.

The disclosed mechanism also overcomes the limitations of current AR technologies, such as location and spatial constraints. By using a combination of data processing techniques and communication protocols, the disclosed mechanism ensures faster transmission of data, making it possible for users to interact with each other in real-time.

With the disclosed mechanism, users can now engage with each other seamlessly, regardless of the types of XR technologies they are using. This is a significant step towards creating a more immersive and interactive virtual environment. In other words, the disclosed mechanism represents a significant breakthrough in the field of XR interaction.

This summary overall describes the basic concept of the disclosed mechanism and covers the problem to be solved, the means to solve the problem and the achieved effect. Therefore, it shall be appreciated that this summary is provided only as an introduction to the following detailed description. The preferred embodiments with details are described in the following paragraphs accompanying the appended drawings.

Figure 1:
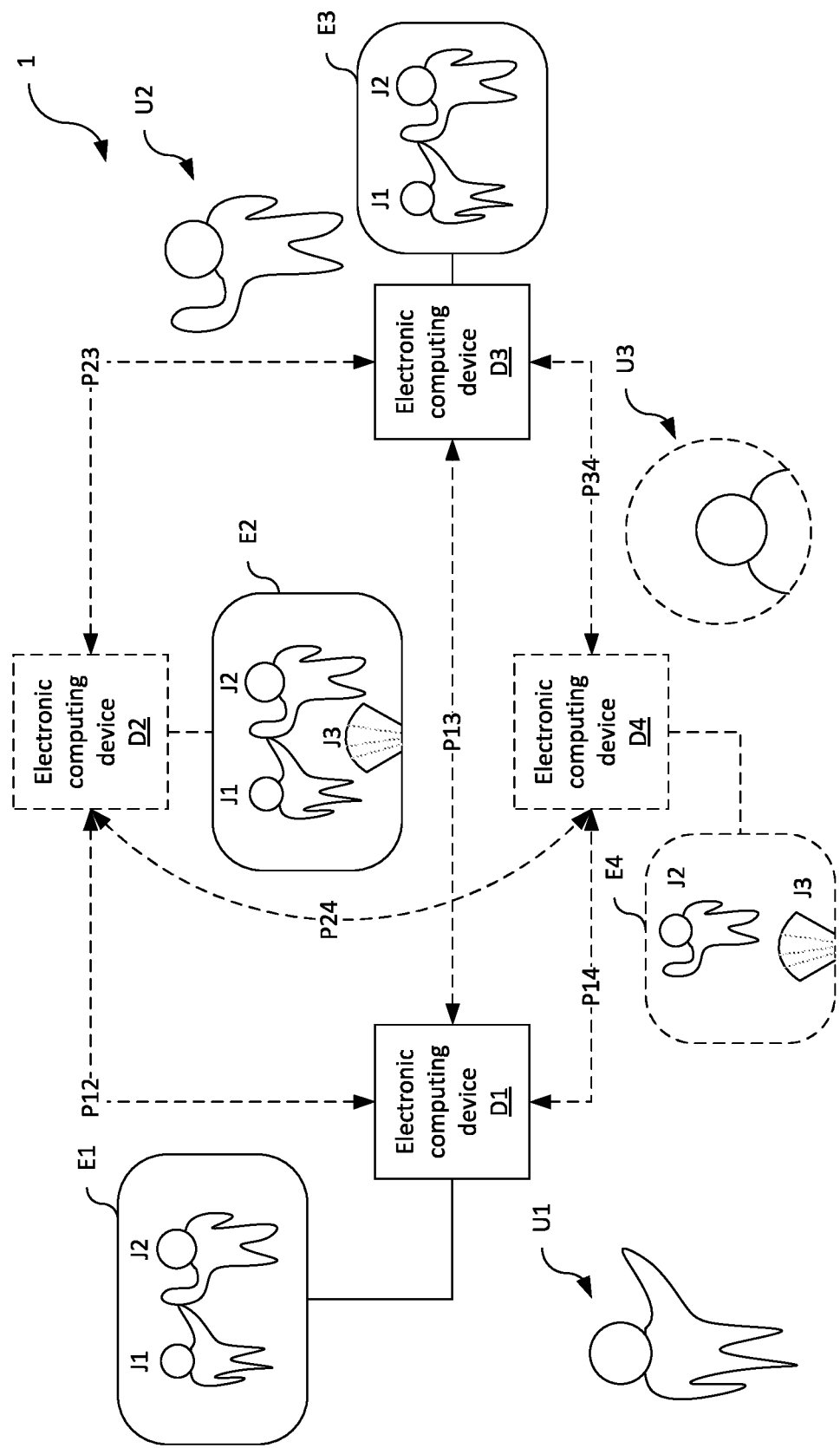
FIG. 1 depicts a schematic view of an XR system according to one or more embodiments of the present disclosure.

The contents shown in FIGS. 1-5 are only for easily illustrating the embodiments, instead of limiting the scope of the present disclosure.

DETAILED DESCRIPTION OF THE INVENTION

The embodiments described in the following description are not intended to limit the disclosed content to any specific environment, applications, or implementations. It should be appreciated that, in the following embodiments and the attached drawings, elements unrelated to the embodiments are omitted from depiction. In addition, dimensions of and dimensional scales among individual elements in the attached drawings are provided only for illustration, instead of limitations. Moreover, the same (or similar) reference numerals may correspond to the same (or similar) elements if suitable, unless otherwise specified.

The terms used herein are for the purpose of describing the embodiments only and are not intended to limit the invention. The singular form "a" is intended to include the plural form as well, unless the context clearly dictates otherwise. The terms "comprise", "include" and the like designate the existence of the roles, integers, steps, operations and/or elements, but do not exclude the existence or addition of one or more other roles, integers, steps, operations, elements and/or combinations thereof. The term "and/or" includes any and all combinations of one or more of the associated listed items. Although the terms "first", "second", "third", etc. may be used herein to describe various elements, these elements should not be limited by these terms. These terms are only used to distinguish one element from another. Thus, for example, a first element described below could also be referred to as a second element without departing from the spirit and scope of the present invention.

Figure 2:
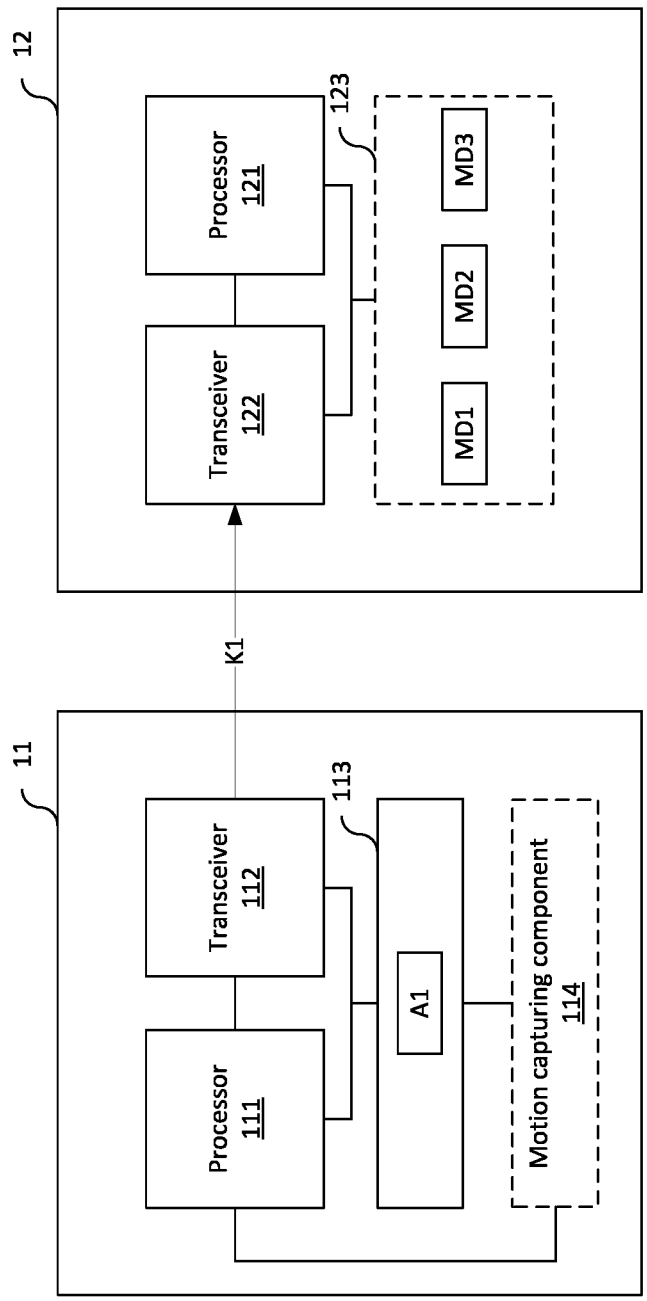
FIG. 2 depicts a schematic view of the sender device and the recipient device in the XR system as shown in FIG. 1.

FIG. 1 depicts a schematic view of an XR system according to one or more embodiments of the present disclosure. FIG. 2 depicts a schematic view of the sender device and the recipient device in the XR system 1 as shown in FIG. 1. Please first refer to FIG. 1. The first way of implementation of the proposed solution mechanism involves an XR system 1, which, in general, is able to provide a real-time presentation of virtual objects (e.g., avatars/virtual characters corresponding to the real-world users of the XR system 1, scenes, decorative objects, interactive objects, or the like) in different XR environments such as AR, VR, 3D, etc. The XR system 1 also allows users to remotely interact with each other or with other virtual object on their own end devices. Said interaction may be performed via, for example, voice, hand gestures, postures, facial expressions, etc.

To achieve the aforementioned results, the XR system 1 may comprise multiple electronic computing devices, for example, electronic computing devices D1-D4 as shown in FIG. 1. Each electronic computing device may maintain its own XR environment (e.g., AR, VR, 3D, etc.) Specifically, the electronic computing devices D1-D4 may maintain XR environments E1-E4, respectively.

Each electronic computing device may basically comprise a transceiver. The transceiver of each electronic computing device may be configured to perform wired or wireless communication with other devices outside. Taking wireless communication as an example, the transceiver may comprise, but is not limited to, an antenna, an amplifier, a modulator, a demodulator, a detector, an analog-to-digital converter, a digital-to-analog converter or other communication elements. Taking wired communication as an example, the transceiver may be, for example but not limited to, a gigabit Ethernet transceiver, a gigabit Ethernet interface converter (GBIC), a small form-factor pluggable (SFP) transceiver, a ten-gigabit small form-factor pluggable (XFP) transceiver, or the like. The electronic computing devices D1-D4 may communicate with each other via their own transceivers in channels P12, P13, P14, P23, P24, and P34 as shown in FIG. 1.

Each electronic computing device may further comprise a processor electrically connected with the transceiver. The processor of each electronic computing device may be any of various microprocessors or microcontrollers capable of signal processing. The microprocessor or the microcontroller is a kind of programmable special integrated circuit that has the functions of operation, storage, output/input or the like. Moreover, the microprocessor or the microcontroller can accept and process various coded instructions, thereby performing various logical operations and arithmetical operations, and outputting corresponding operation results. The processor may be programmed to interpret various instructions so as to process the data in the electronic computing device and execute various operational programs or applications.

In some embodiments, each electronic computing device in the XR system 1 may further comprise a storage electrically connected with the processor and the transceiver. The storage, in general, may be configured to store data generated by the electronic computing device, data transmitted by external devices and/or data input by a user. The storage may comprise a first-level memory (which is also called a main memory or internal memory), and the processor may directly read instruction sets stored in the first-level memory, and execute these instruction sets if needed. The storage may optionally comprise a second-level memory (which is also called an external memory or secondary memory), and the second-level memory may use a data buffer to transmit data stored to the first-level memory. For example, the second-level memory may be a hard disk, an optical disk or the like, without being limited thereto. The storage may optionally comprise a third-level memory, such as Plug-and-Play storage or cloud storage.

In some embodiments, in addition to a storage, the electronic computing device in the XR system 1 may further comprise at least one motion capturing component electrically connected with the processor and the storage. The motion capturing component may be configured to capture, or cooperate with external motion capturing device to capture, the contour, shape, and/or motion of a human/animal body or certain parts of said body. For example, the facial expression or the shape, spatial positions, and postures of hands, feet, ears, chest, waist, spine, sternum, limbs and/or other parts of a person (or called a "performer") may be captured by the motion capturing component itself, or further in cooperation with external motion capturing devices. Animal postures such as the wings, tails, or the like may also be captured by the motion capturing component itself, or further in cooperation with external motion capturing devices. The data generated by the motion capturing component may be in the format of, e.g., Motion Vision Neuroscience (MVN), Biovision Hierarchy (BVH), Filmbox (FBX), JSON, CSV, TSV, XML, Protobuf or other similar data formats, or may be converted into said format by the processor.

The motion capturing component may be implemented as an integrated circuit that supports device and/or software provided by companies such as Xsens, Neuron, Rokoko, Vicon, Optitrack, iClone from Reallusion, FaceRig, ARKit face tracking, ARcore face tracking, Vuforia face tracking, etc. The motion capturing component may also support other depth camera, motion tracker or motion capturing device than those famous existing products mentioned above, or may support an AI model that detects body motions through images and videos, such as mediapipe, blazepose, etc. In some embodiments, the motion capturing component may adopt AI library/toolkit such as TensorFlow, PyTorch, JAX, Kaldi, framework or other similar frameworks to achieve the aforementioned AI detection features. In some embodiments, the motion capturing component may be implemented as at least one of those products mentioned above, being electrically connected with the processor via a data transmission interface of the electronic computing device.

In some embodiments, the motion capturing component, when implemented as an integrated circuit, may be further integrated into the processor of the corresponding electronic computing device.

Please refer to FIG. 2. Each of the electronic computing devices D1-D4 as shown in FIG. 1 may serve as a sender device 11 or a recipient device 12 depending on different scenarios/use cases. The definition of sender and recipient basically refers to the device sending and receiving a data block K1, which will be further explained below.

The sender device 11 may basically comprise a processor 111, a transceiver 112 electrically connected with the processor 111, and a storage 113 electrically connected with the processor 111 and the transceiver 112. In some embodiments, the sender device 11 may further comprise at least one motion capturing component 114 electrically connected with the processor 111 and the storage 113. On the other hand, the recipient device 12 may basically comprise a processor 121 and a transceiver 122 electrically connected with the processor 121. In some embodiments, the recipient device 12 may further comprise a storage 123 electrically connected with the processor 121 and the transceiver 122.

Note that the processor 111, transceiver 112, storage 113, and at least one motion capturing component 114 of the sender device 11 as shown in FIG. 2 and mentioned below may respectively refer to the processor, transceiver, storage, and motion capturing component of the electronic computing device among the electronic computing devices D1-D4 that serves as the sender device 11, the possible/feasible structures, implementations, applications of which have already been thoroughly described above, and thus are not repeated herein. Similarly, the processor 121, transceiver 122, and storage 123 of the recipient device 12 as shown in FIG. 2 and mentioned below may respectively refer to the processor, transceiver, and storage of the electronic computing device among the electronic computing devices D1-D4 that serves as the recipient device 12, the possible/feasible structures, implementations, applications of which have also been thoroughly described above.

To achieve the XR interaction among users, one or more virtual objects representing certain user or manipulated by said user should be presented in other users' XR environment executed on their electronic computing devices. Therefore, the electronic computing device of said user (hereinafter referred to as the sender device 11) may store, via its storage 113, an action data A1 corresponding to the virtual object.

The virtual object may be, for example but not limited to, an avatar in a form of human, animal, plant, still object, visual effects, or the like. The action data A1 may describe the existence, looks, motion, etc., of a target. Said target may be called a performer such as the user of the sender device 11. The action data A1 may be in the format of, for example but not limited to, BVH, FBX, JSON, CSV, TSV, XML, Protobuf or other similar data formats.

In some embodiments, the action data A1 may be generated by the sender device 11 via its motion capturing component 114 capturing the user's posture, hand gesture, facial expressions, or the like.

The sender device 11 may further generate, via its processor 111, the data block K1 based on the action data A1. The data block K1 may comprise at least tag information, object information, and motion information. The data block K1 overall may describe the existence, looks, and/or motions of a virtual object in a common XR environment.

The tag information may indicate the device that generated the action data A1 (in this case, the electronic computing device that serves as the sender device 11). The tag information is useful for identifying the source of data and is further useful for processing the data block K1 accordingly. For example, the tag information may indicate that the action data A1 is generated by a motion capturing device from Xsens, or generated by ARKit of an iPhone, ARCore of an Android smartphone, etc.

The object information may be used for describing the details of the virtual object. Specifically, the object information may comprise the attributes of the virtual object available for describing the existence, looks, motion, or the like thereof. For example, when the action data A1 corresponds to the user's hand (i.e., the virtual object to be presented is a virtual hand), the object information may comprise attributes corresponding to the positions of the joints of the hand relative to the motion capturing component/external motion capturing device.

The motion information, as its name suggests, may be used for describing the motions of the virtual object in the common XR environment. Specifically, the motion information may comprise the value changes of said attributes as described in the object information when the virtual object is to be presented in the common XR environment. The common XR environment may be one of a VR environment, an AR environment, or a 3D reality environment and may be maintained by both the sender device 11 and the recipient device 12.

Note that the common XR environment is not necessarily executed on the sender device 11 and the recipient device 12 to be "maintained". Instead, the common XR environment may be maintained by the sender device 11 and the recipient device 12 via storing the logics for the transformation of the virtual object between the common XR environment and themselves, such that the virtual object may be successfully presented in the common XR environment according to the data block K1.

The data block K1 may be provided from the sender device 11 to the recipient device 12 via the transceivers 112 and 122. The processor 121 may present the motions of the virtual object in a recipient XR environment according to the tag information, the object information, and the motion information. The recipient XR environment may be the XR environment maintained and executed on the recipient device 12.

Specifically, the processor 121 may identify that the source generated the action data A1 according to the tag information (e.g., ARKit of an iPhone) and the object whose motions to be presented in the common XR environment and the recipient XR environment (e.g., an eagle posing by a performer's hand). The processor 121 may then recognize the designated motions of said virtual object in the common XR environment in accordance with the motion information (e.g., flapping its wings), and may thus transform said motions into the recipient XR environment since it also maintains the common XR environment. Accordingly, the transmission of the data block K1 enables the motions captured/generated on the sender device 11 to be presented on the recipient device 12, even if the two devices adopt different XR technologies (e.g., AR and 3D VR).

In some embodiments, the storage 123 may store at least one of an AR processing module MD1, a VR processing module MD2, and a 3D processing module MD3 corresponding to the recipient XR environment. The processor 121 may further present the motions of the virtual object in the second XR environment via the AR processing module MD1, the VR processing module MD2, or the 3D processing module MD3.

In some embodiments, the data block K1 may further comprise correction information. Since different XR platforms and/or motion capturing technologies adopts different vision standards (e.g., angles, distances for capturing, recording, viewing and/or presenting), the vision on the recipient device 12 is preferably corrected for better user experience.

The processor 111 may calculate the required information for vision correction for presentation in the common XR environment according to the source of the action data A1. The processor 121 may then perform vision correction according to the correction information between the common XR environment and its own XR environment (i.e., the recipient XR environment).

In some embodiments, the storage 113 may further store at least one AI model, and the processor 111 may generate the action data A1 via the at least one AI model. That is, the action data A1, in these embodiments, is not necessarily generated in accordance with a performer's real-world postures, hand gestures, and/or other live performances. The processor 111 may assign motions to certain virtual objects or create a new virtual object by generating said action data A1 via AI.

In addition, the AI model stored in the sender device 11 may instantly generate animations, objects, pictures, music, sounds, videos, interactions, virtual character interactions, virtual character animations, virtual character actions, and virtual character expressions in the various types of XR environment. The AI model may be CNN, RNN, LSTM, Autoregressive TTS, Tacotron, ESPNet, GlowTTS, FastSpeech, Vocoder, MelGAN, HiFi-GAN, Transformer, GAN, StyleGAN, GPT, etc., in cooperation with AI library/toolkit such as TensorFlow, PyTorch, JAX, Kaldi, framework or other similar frameworks. The models may include functions such as: image recognition, object recognition, behavior recognition, hand tracking, body tracking, face recognition, image emotion recognition, voice emotion recognition, voiceprint recognition, space recognition, voice recognition, 2D/3D image generation, sentence generation, sound generation, sound synthesis, speech recognition, voice chat system, music creation, 2D/3D object model creation, character creation or other similar applications of AI models.

Please refer to FIG. 1 and FIG. 2. The XR system 1 shown in FIG. 1 is further explained along with FIG. 2. In some embodiments, the XR system 1 may be implemented as a centralized system, in which the electronic computing device D2 may serve as a server, and the electronic computing devices D1, D3, and D4 may serve as client devices. The users U1-U3 of the client devices may interact with each other on their own devices via the transmission of data blocks that have the same structure with the aforementioned data block K1 (hereinafter referred to as a "Wonder data block".)

The server may be a cloud server, such as Amazon Web Service (AWS), Google Cloud Platform (GCP), Microsoft Cloud, or http, ftp, Web Socket, or socket installed on a local computer. The client may be a smartphone, laptop, tablet computer, mobile computing device, or the like. The client may also be the combination of a VR goggle and a computing device or the combination of a motion capturing device and a computing device.

Any of the client devices may serve as the sender device 11, e.g., the electronic computing device D1. The electronic computing device D1 may capture the posture, gesture, facial expressions, or the like of a user U1 via its motion capturing component and generate corresponding action data A1, or generate action data A1 by AI models as described above. The electronic computing device D1 may then generate the corresponding Wonder data block in the same way as described above regarding the generation of data block K1, such that a human-like virtual object J1 may be presented in the XR environments of other client devices (e.g., electronic computing device devices D3, D4). The electronic computing device D1 as the sender device 11 may also present the virtual object J1 in its own XR environment E1.

In some embodiments, the electronic computing device D1 may transmit the Wonder data block to the server, i.e., electronic computing device D2 via the channel P12. The server/electronic computing device D2 may then forward the Wonder data block to the other clients, i.e., electronic computing devices D3 and D4, via the channels P23 and P24, respectively. In this case, the server/electronic computing device D2 may serve as the recipient device 12 as described in FIG. 2 first (with the electronic computing device D1 being the sender device 11), and then serve as the sender device 11 for forwarding the Wonder data block to the other client devices (with each of the electronic computing devices D3 and D4 being the recipient device 12). In addition, the XR environment E2 of the server/electronic computing device D2 is the common XR environment as described regarding FIG. 2, and the electronic computing devices D3 and D4 may present the motions of the virtual object J1 in their own XR environments E3 and E4 according to at least the tag information, object information, and motion information included in the Wonder data block.

In some embodiments, the processor of the server/electronic computing device D2 may arrange the frames to be presented in its XR environment E2 (i.e., the common XR environment) based on the time of receipt of the Wonder data blocks from the clients that serve as the sender device 11 (e.g., electronic computing device D1), and forward the Wonder data blocks to the clients that serve as the recipient device 12 accordingly. This mechanism ensures the fluency and reasonability of contents presented on each device.

In some embodiments, the electronic computing device D1 may directly transmit the Wonder data block to the other client devices that serves as the recipient device 12, e.g., the electronic computing devices D3 and D4, via the channels P13 and P14, respectively.

Similarly, the electronic computing devices D3 and D4 may also provide their own Wonder data blocks to other clients (e.g., the electronic computing device D1) with or without the server/electronic computing device D2 in between, such that the motions of their corresponding virtual objects J2 (e.g., in a human-like form corresponding to the user U2) and J3 (e.g., in a form of a folding fan) may be presented in other clients' XR environments via the processing of Wonder data blocks.

Note that each virtual object, despite being generated by the corresponding electronic computing device, is not necessarily of the same or similar looks with the user of said electronic computing device. For example, the virtual object J2 may be a human-like avatar but has a different gender, appearance, height, and/or other attributes, with the user U2.

Moreover, in some embodiments, one user/electronic computing device may have more than one virtual object presented and synchronized in other clients' XR environments via Wonder data blocks. In such cases, the motions of a certain virtual object may be decided and controlled by the user via posing and/or performing to the motion capturing component and/or the external motion capturing device collaborating with the motion capturing component, and the motions of other virtual objects corresponding to the same electronic computing device may be automatically decided and controlled (via Wonder data blocks) by, e.g., a program or AI model of the device, or may be decided and controlled (via Wonder data blocks) in accordance with the instructions provided by the user via the transceiver or an I/O interface (e.g., touch display, microphone (collab with speech to text processing), mouse, keyboard, etc.) The fact that a virtual object corresponding to a user may be controlled by a program or AI model means that the virtual object may be an independent character or object from the user and thus may have an independent personality, mood, behavior, etc.

Figure 3:
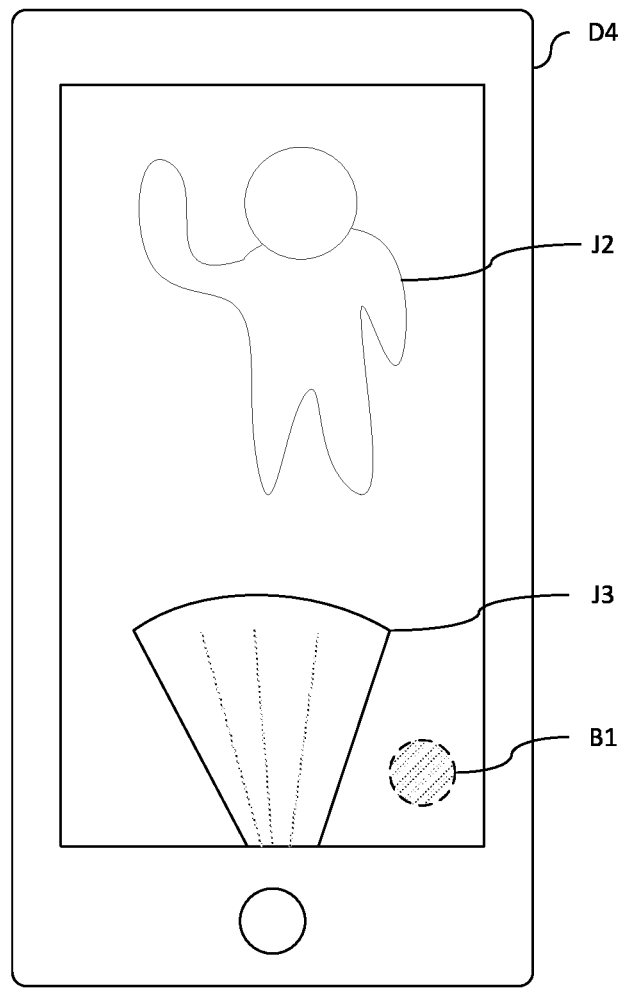
FIG. 3 depicts a schematic view of a screenshot of an electronic computing device in the XR system as shown in FIG. 1.
Figure 4:
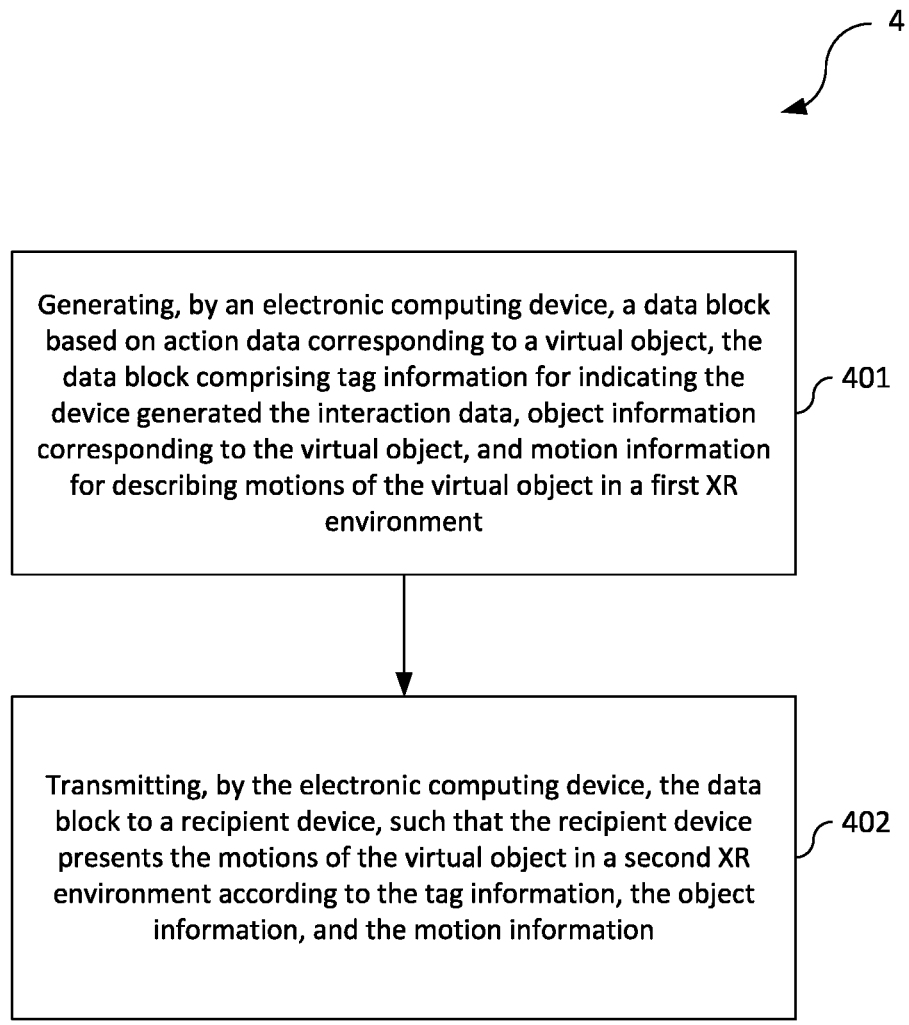
FIG. 4 depicts a method for XR interaction according to one or more embodiments of the present disclosure.
Figure 5:
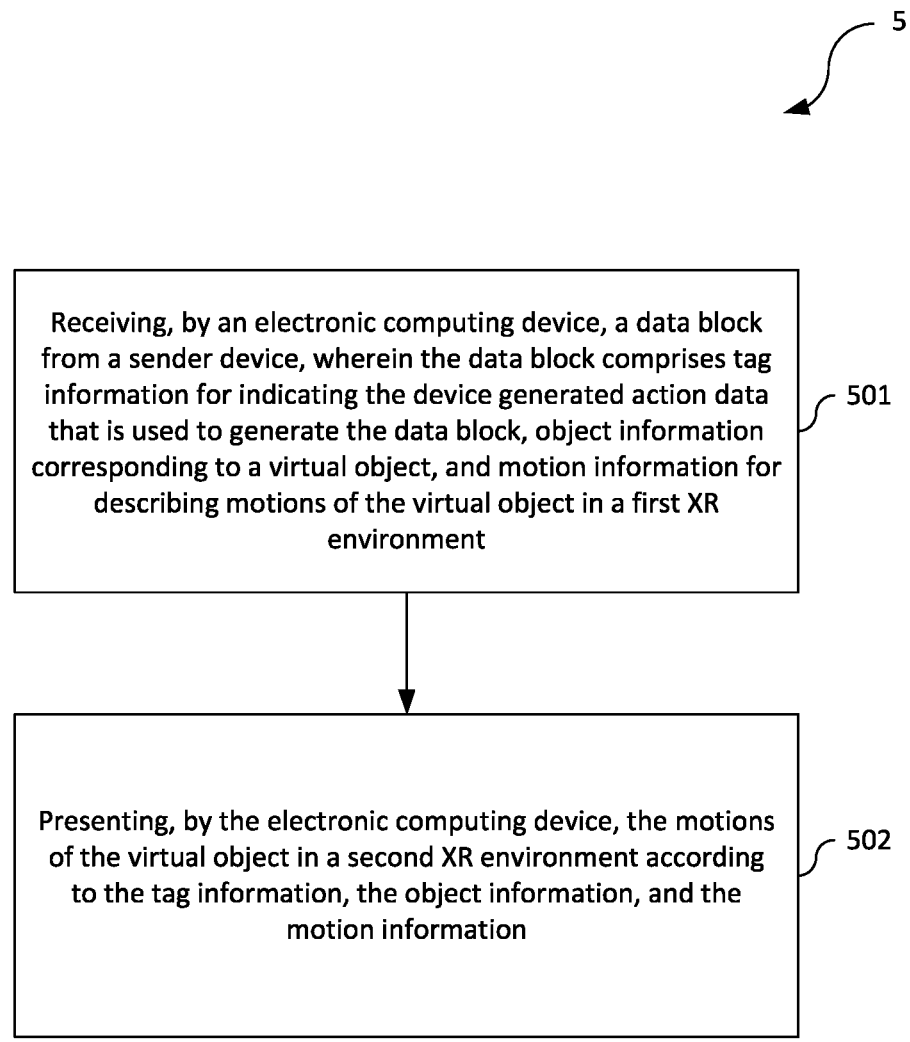
FIG. 5 depicts another method for XR interaction according to one or more embodiments of the present disclosure.

Please refer to FIG. 3, it depicts a schematic view of a screenshot of an electronic computing device in the XR system as shown in FIG. 1. In some embodiments, a client such as the electronic computing device D4 shown in FIG. 1 may provide an interactive means that allows its user U3 to interact with other users' virtual objects.

For example, a virtual button B1 may be provided in the user interface of the electronic computing device D4. The user U3 may press on the button B1, causing the electronic computing device D4 to generate a Wonder data block corresponding to a waving action of the virtual object J3 on the virtual object J2 of the user U2. In some embodiments, such a Wonder data block may also be generated by the motion capturing component (or in cooperation with external motion capturing devices) of the electronic computing device D4.

The transmission of said Wonder data block to other clients may lead to the presence of the waving action in every XR environments, and thus the users of the XR system 1 may observe that the virtual object J2 has been hit by the virtual object J3 on the XR environments provided by their own devices.

In some embodiments, the server/electronic computing device D2 may serve as the sender device 11 not by forwarding Wonder data blocks received from other client devices, but by generating Wonder data blocks corresponding to motions of any existing virtual object or even a new virtual object. That is, the server/electronic computing device D2 may issue state changes to the XR environments in the XR system 1 via Wonder data blocks.

In some embodiments, when a client device updates its spatial information (e.g., real-time distance between the user and the virtual object, the absolute distance, the distance between client devices, the distance between virtual objects, the joining of a new virtual object 3D, AR, VR spatial location, the spatial information of AR, VR, 3D reality, or the like may be converted into Wonder data blocks (with the space-related elements such as a wall, surface, corner, etc., or other virtual objects being the target object described by the object information and motion information) for synchronous update on different client devices.

In some embodiments, the transmission of Wonder data blocks may be performed via the reliable user datagram protocol (RUDP) to ensures faster and more reliable transmission of data.

In some embodiments, the transmission of Wonder data blocks may involve data compression, encryption, and serialization performed by the processor 111 of the sender device 11 through the bottom layer. For example, data encryption, such as AES-256 encryption, Rijndael encryption, Blowfish, IDEA, RC4, RC5, RC6 and other encryption formats for encryption may be performed after the data blocks are merged. Data compression into formats such as 7za and LZMA2, tar, bz2, xz, rar, zst, or other compression formats for compression may also be performed. In addition, data serialization such as converting into bytes, Protobuf or saving into BVH, FBX, JSON, CSV, TSV, XML, etc. may also be performed.

In some embodiments, the channels P12, P23, P34, P14, P13, and P24 in the XR system 1 may use cloud acceleration and/or high-speed broadcasting stations to achieve faster data transmission.

In some embodiments, the users may have the option to hide certain contents in their XR environments (e.g., the user U4 chose not to present the virtual object J1 in the XR environment E4. Such action may be carried out via the communication between the server/electronic computing device D2 and the electronic computing device D4 via the channel P14.) Additionally, in some embodiments, the presence of certain virtual object may be decided by all online participants of the XR system 1 via mechanisms such as voting, membership levels (e.g., users having higher level of membership than other participants may have more power to decide the presence of certain virtual objects), etc.

In some embodiments, the contents in each XR environment of the XR system 1 may be simultaneously streamed through live streaming platforms such as OBS, Streamlabs, Twitch, YouTube, Mixer, Twitter, Facebook, mobile apps, etc.

According to the above, the XR system 1 facilitates the real-time interaction among users in different XR environments through their own XR devices, thanks to the rapid and massive exchanges of Wonder data blocks therein, and thus making cross-platform XR interaction possible. In addition, the modularized structure of Wonder data blocks is also capable of improving development efficiency.

The second way of the proposed solution mechanism involves methods 4 and 5 for XR interaction. The method 4 may comprise steps as follows:
  generating, by an electronic computing device, a data block based on action data corresponding to a virtual object, the data block comprising tag information for indicating the device generated the action data, object information corresponding to the virtual object, and motion information for describing motions of the virtual object in a first XR environment (marked as a step 401); and
  transmitting, by the electronic computing device, the data block to a recipient device, such that the recipient device presents the motions of the virtual object in a second XR environment according to the tag information, the object information, and the motion information (marked as a step 402).

In some embodiments, regarding the method 4, the data block may further comprise correction information, and the recipient device may present the motions of the virtual object according to the tag information, the object information, the motion information, and the correction information, wherein the recipient device presents vision correction according to the correction information.

In some embodiments, regarding the method 4, the electronic computing device may transmit the data block to the recipient device via a server that maintains the first XR environment.

In some embodiments, regarding the method 4, the electronic computing device may comprise at least one motion capturing component. Moreover, the method 4 may further comprise a step as follows: generating, by the electronic computing device, the action data via capturing motions of a performer corresponding to the virtual object with the at least one motion capturing component.

In some embodiments, the method 4 may further comprise a step as follows: generating, by the electronic computing device, the action data via at least one AI model stored in the electronic computing device.

As for the method 5, it may comprise steps as follows:
  receiving, by an electronic computing device, a data block from a sender device, wherein the data block comprises tag information for indicating the device generated action data that is used to generate the data block, object information corresponding to a virtual object, and motion information for describing motions of the virtual object in a first XR environment (marked as a step 501); and
  presenting, by the electronic computing device, the motions of the virtual object in a second XR environment according to the tag information, the object information, and the motion information (marked as a step 502).

In some embodiments, regarding the method 5, the electronic computing device may maintain the second XR environment and store at least one of an AR processing module, a VR processing module, and a 3D processing module corresponding to the second XR environment. In addition, the method 5 may further comprise a step as follows: presenting, by the electronic computing device, the motions of the virtual object in the second XR environment via the AR processing module, the VR processing module, or the 3D processing module.

In some embodiments, regarding the method 5, the data block may further comprise correction information, and the electronic computing device may present the motions of the virtual object according to the tag information, the object information, the motion information, and the correction information. In addition, the method 5 may further comprise a step as follows: performing, by the electronic computing device, vision correction according to the correction information.

In some embodiments, regarding the method 5, the electronic computing device may receive the data block from the sender device via a server that maintains the first XR environment, and the electronic computing device may maintain the second XR environment.

In some embodiments, regarding the method 5, the data block may be generated by at least one AI model of the sender device.

In some embodiments, the method 4 and method 5 may each be implemented as a computer program product. When the computer program product is loaded into an electronic computing device, a plurality of program instructions may be accorded to execute the method 4 or method 5 as described above. The computer program product may be stored in a non-transitory tangible machine-readable medium/computer readable medium, which may be but not limited to, a read-only memory (ROM), a flash memory, a floppy disk, a mobile hard disk, a magnetic tape, a database accessible to networks, or any other storage medium with the same function and well known to those of ordinary skill in the art.

Each embodiment of the method 4 or method 5 basically corresponds to a certain embodiment of the XR system 1. Therefore, those of ordinary skill in the art can fully understand and implement all the corresponding embodiments of the method 4 or method 5 simply by referring to the above descriptions of the XR system 1, even though not all of the embodiments of the method 4 and method 5 are described in detail above.

Although various embodiments are disclosed herein, the invention is not limited to these embodiments. Equivalent objects or methods of the above-described embodiments (e.g., modifications and/or combinations of the above-described embodiments) are also part of the invention without departing from the spirit and scope of the present disclosure. The protection scope of the present invention is subject to the content defined by the following claims as appended.

What is claimed is:

1. An electronic computing device for extended reality (XR) interaction, comprising:
    a storage being configured to store action data corresponding to a virtual object;
    a processor, being electrically connected with the storage and configured to generate a data block based on the action data, wherein the data block comprises tag information, object information corresponding to the virtual object, and motion information for describing motions of the virtual object in a first XR environment, wherein the tag information indicates a device generated the action data and at least one of: a type of XR platform and a type of motion technology used by the device to generate the action data; and
    a transceiver, being electrically connected with the storage and the processor and configured to transmit the data block to a recipient device, such that the recipient device presents the motions of the virtual object in a second XR environment according to the tag information, the object information, and the motion information.

2. The electronic computing device of claim 1, wherein:
    the data block further comprises correction information; and
    the recipient device presents the motion of the virtual object according to the tag information, the object information, the motion information, and the correction information, wherein the recipient performs vision correction according to the correction information.

3. The electronic computing device of claim 1, wherein the transceiver transmits the data block to the recipient device via a server that maintains the first XR environment.

4. The electronic computing device of claim 1, further comprising at least one motion capturing component electrically connected with the storage and the processor, the at least one motion capturing component being configured to generate the action data via capturing motions of a performer corresponding to the virtual object.

5. The electronic computing device of claim 1, wherein the storage is further configured to store at least one AI model, and the processor is further configured to generate the action data via the at least one AI model.

6. An electronic computing device for extended reality (XR) interaction, comprising:
    a transceiver, being configured to receive a data block from a sender device, wherein the data block comprises tag information, object information corresponding to a virtual object, and motion information for describing motions of the virtual object in a first XR environment, wherein the tag information indicates a device generated the action data that is used to generate the data block and indicates at least one of: a type of XR platform and a type of motion technology used by the device to generate the action data; and
    a processor, being electrically connected with the transceiver and configured to present the motions of the virtual object in a second XR environment according to the tag information, the object information, and the motion information.

7. The electronic computing device of claim 6, wherein:
    the processor is further configured to maintain the second XR environment;
    the electronic computing device further comprises a storage electrically connected with the processor and the transceiver, the storage being configured to store at least one of an AR processing module, a VR processing module, and a 3D processing module corresponding to the second XR environment; and
    the processor is further configured to present the motions of the virtual object in the second XR environment via the AR processing module, the VR processing module, or the 3D processing module.

8. The electronic computing device of claim 6, wherein:
    the data block further comprises correction information; and
    the processor presents the motion of the virtual object according to the tag information, the object information, the motion information, and the correction information, wherein the processor is further configured to perform vision correction according to the correction information.

9. The electronic computing device of claim 6, wherein:
    the transceiver receives the data block from the sender device via a server that maintains the first XR environment; and
    the processor is further configured to maintain the second XR environment.

10. The electronic computing device of claim 6, wherein the data block is generated by at least one AI model of the sender device.

11. A method for extended reality (XR) interaction, comprising:
    generating, by an electronic computing device, a data block based on action data corresponding to a virtual object, the data block comprising tag information, object information corresponding to the virtual object, and motion information for describing motions of the virtual object in a first XR environment, wherein the tag information indicates a device generated the action data and at least one of: a type of XR platform and a type of motion technology used by the device to generate the action data; and
    transmitting, by the electronic computing device, the data block to a recipient device, such that the recipient device presents the motions of the virtual object in a second XR environment according to the tag information, the object information, and the motion information.

12. The method of claim 11, wherein:
    the data block further comprises correction information; and
    the recipient device presents the motions of the virtual object according to the tag information, the object information, the motion information, and the correction information, wherein the recipient device presents vision correction according to the correction information.

13. The method of claim 11, wherein the electronic computing device transmits the data block to the recipient device via a server that maintains the first XR environment.

14. The method of claim 11, wherein the electronic computing device comprises at least one motion capturing component, and the method further comprises:
generating, by the electronic computing device, the action data via capturing motions of a performer corresponding to the virtual object with the at least one motion capturing component.

15. The method of claim 11, further comprising:
generating, by the electronic computing device, the action data via at least one AI model stored in the electronic computing device.

16. A method for extended reality (XR) interaction, comprising:
receiving, by an electronic computing device, a data block from a sender device, wherein the data block comprises tag information, object information corresponding to a virtual object, and motion information for describing motions of the virtual object in a first XR environment, wherein the tag information indicates a device generated the action data that is used to generate the data block and indicates at least one of: a type of XR platform and a type of motion technology used by the device to generate the action data; and
presenting, by the electronic computing device, the motions of the virtual object in a second XR environment according to the tag information, the object information, and the motion information.

17. The method of claim 16, wherein the electronic computing device maintains the second XR environment and stores at least one of an AR processing module, a VR processing module, and a 3D processing module corresponding to the second XR environment, and the method further comprises:
presenting, by the electronic computing device, the motions of the virtual object in the second XR environment via the AR processing module, the VR processing module, or the 3D processing module.

18. The method of claim 16, wherein:
the data block further comprises correction information; and
the electronic computing device presents the motion of the virtual object according to the tag information, the object information, the motion information, and the correction information, wherein the method further comprises performing, by the electronic computing device, vision correction according to the correction information.

19. The method of claim 16, wherein:
the electronic computing device receives the data block from the sender device via a server that maintains the first XR environment; and
the electronic computing device maintains the second XR environment.

20. The method of claim 16, wherein the data block is generated by at least one AI model of the sender device.

21. A non-transitory computer-readable medium, storing a plurality of program instructions for an electronic computing device to execute a method for extended reality (XR) interaction as follows:
generating a data block based on action data corresponding to a virtual object, the data block comprising tag information, object information corresponding to the virtual object, and motion information for describing motions of the virtual object in a first XR environment wherein the tag information indicates a device generated the action data and at least one of: a type of XR platform and a type of motion technology used by the device to generate the action data; and
transmitting the data block to a recipient device, such that the recipient device presents the motions of the virtual object in a second XR environment according to the tag information, the object information, and the motion information.

22. The non-transitory computer-readable medium of claim 21, wherein:
the data block further comprises correction information; and
the recipient device presents the motion of the virtual object according to the tag information, the object information, the motion information, and the correction information, wherein the recipient device performs vision correction according to the correction information.

23. The non-transitory computer-readable medium of claim 21, wherein the electronic computing device transmits the data block to the recipient device via a server that maintains the first XR environment.

24. The non-transitory computer-readable medium of claim 21, wherein the electronic computing device comprises at least one motion capturing component, and the method further comprises:
generating the action data via capturing motions of a performer corresponding to the virtual object with the at least one motion capturing component.

25. The non-transitory computer-readable medium of claim 21, wherein the method further comprises:
generating the action data via at least one AI model stored in the electronic computing device.

26. A non-transitory computer-readable medium, storing a plurality of program instructions for an electronic computing device to execute a method for extended reality (XR) interaction as follows:
receiving a data block from a sender device, wherein the data block comprises tag information, object information corresponding to a virtual object, and motion information for describing motions of the virtual object in a first XR environment, wherein the tag information indicates a device generated action data that is used to generate the data block and indicates at least one of: a type of XR platform and a type of motion technology used by the device to generate the action data; and
presenting the motions of the virtual object in a second XR environment according to the tag information, the object information, and the motion information.

27. The non-transitory computer-readable medium of claim 26, wherein the electronic computing device maintains the second XR environment and stores at least one of an AR processing module, a VR processing module, and a 3D processing module corresponding to the second XR environment, and the method further comprises:
presenting the motions of the virtual object in the second XR environment via the AR processing module, the VR processing module, or the 3D processing module.

28. The non-transitory computer-readable medium of claim 26, wherein:
the data block further comprises correction information; and
the electronic computing device presents the motions of the virtual object according to the tag information, the object information, the motion information, and the correction information, wherein the method further comprises:

performing vision correction corresponding to the data source.

29. The non-transitory computer-readable medium of claim 26, wherein:
the electronic computing device receives the data block from the sender device via a server that maintains the first XR environment; and
the electronic computing device maintains the second XR environment.

30. The non-transitory computer-readable medium of claim 26, wherein the data block is generated by at least one AI model of the sender device.

\* \* \* \* \*